(12) United States Patent
Trussel et al.

(10) Patent No.: US 9,042,919 B2
(45) Date of Patent: May 26, 2015

(54) SHARING OF LOCATION INFORMATION IN A NETWORKED COMPUTING ENVIRONMENT

(76) Inventors: Bryan Trussel, Redmond, WA (US); Jeremy Mercer, Woodinville, WA (US); Stephen Miller, Woodinville, WA (US)

( * ) Notice: Subject to any disclaimer, the term of this patent is extended or adjusted under 35 U.S.C. 154(b) by 208 days.

(21) Appl. No.: 13/054,075

(22) PCT Filed: Jul. 16, 2009

(86) PCT No.: PCT/US2009/050870
§ 371 (c)(1),
(2), (4) Date: Sep. 6, 2011

(87) PCT Pub. No.: WO2010/009328
PCT Pub. Date: Jan. 21, 2010

(65) Prior Publication Data
US 2011/0306366 A1 Dec. 15, 2011

Related U.S. Application Data

(60) Provisional application No. 61/081,313, filed on Jul. 16, 2008.

(51) Int. Cl.
*H04W 24/00* (2009.01)
*H04L 29/06* (2006.01)
*H04W 12/06* (2009.01)
*H04W 8/16* (2009.01)

(52) U.S. Cl.
CPC .............. *H04L 63/0807* (2013.01); *H04W 8/16* (2013.01); *H04L 63/18* (2013.01); *H04W 12/06* (2013.01)

(58) Field of Classification Search
CPC ................................ H04W 12/06; H04W 8/16
USPC ............. 455/457, 456.1, 456.2, 456.3, 404.2, 455/414.2
See application file for complete search history.

(56) References Cited

U.S. PATENT DOCUMENTS

| | | | |
|---|---|---|---|
| 6,885,874 B2 | 4/2005 | Grube | |
| 7,305,365 B1 * | 12/2007 | Bhela et al. | 705/51 |
| 7,366,522 B2 | 4/2008 | Thomas | |
| 2002/0169539 A1 * | 11/2002 | Menard et al. | 701/200 |
| 2003/0060212 A1 * | 3/2003 | Thomas | 455/456 |
| 2006/0046744 A1 * | 3/2006 | Dublish et al. | 455/456.3 |
| 2008/0103829 A1 | 5/2008 | Mankopf | |
| 2008/0147551 A1 | 6/2008 | Connelly | |
| 2009/0292464 A1 * | 11/2009 | Fuchs et al. | 701/208 |
| 2009/0319172 A1 * | 12/2009 | Almeida et al. | 701/201 |
| 2009/0319616 A1 * | 12/2009 | Lewis et al. | 709/206 |
| 2012/0100875 A1 * | 4/2012 | Tysowski | 455/457 |
| 2013/0191483 A1 * | 7/2013 | Jhanji | 709/206 |

* cited by examiner

*Primary Examiner* — Barry Taylor
(74) *Attorney, Agent, or Firm* — Richard C. Vershave; Foster Pepper PLLC

(57) ABSTRACT

A system includes a server and a source client executable on a first electronic device in communication with the server The server is configured to provide to a second electronic device in communication with the server access to location data implementable by a user interface associated with the second electronic device The location data enables the user interface to display the geographical location of the first electronic device The access to the location data is accessible to the second electronic device only during a time interval designated by a user of the first electronic device.

5 Claims, 4 Drawing Sheets

SHARING OF LOCATION INFORMATION IN A NETWORKED COMPUTING ENVIRONMENT

CROSS-REFERENCE TO RELATED APPLICATIONS

This application claims priority from PCT Application No. PCT/US2009/050870, entitled "SHARING OF LOCATION INFORMATION IN A NETWORKED COMPUTING ENVIRONMENT" and filed Jul. 16, 2009, which claims priority from U.S. Provisional Application No. 61/081,313 entitled "SYSTEM AND METHOD FOR SHARING OF LOCATION INFORMATION IN A NETWORKED COMPUTING ENVIRONMENT" and filed Jul. 16, 2008, which are hereby incorporated by reference in their entirety.

BACKGROUND OF THE INVENTION

Technology, such as mobile phones and mobile devices, allows for greater connectivity and communication as a person may remain in constant contact with others. Because various devices maintain a persistent connection with access towers and, subsequently, the Internet, it is possible to pinpoint the location of a person's mobile device (and, hence, the person if one assumes they have their mobile device with them). However, privacy issues are a concern as a person may not wish to allow others to always know their location.

SUMMARY OF THE INVENTION

In an embodiment, a system includes a server and a source client executable on a first electronic device in communication with the server. The server is configured to provide to a second electronic device in communication with the server access to location data implementable by a user interface associated with the second electronic device. The location data enables the user interface to display the geographical location of the first electronic device. The access to the location data is accessible to the second electronic device only during a time interval designated by a user of the first electronic device.

BRIEF DESCRIPTION OF THE DRAWING

Preferred and alternative embodiments of the present invention are described in detail below with reference to the following drawings.

DETAILED DESCRIPTION OF THE PREFERRED EMBODIMENT

The following discussion is presented to enable a person skilled in the art to make and use the subject matter disclosed herein. The general principles described herein may be applied to embodiments and applications other than those detailed above without departing from the spirit and scope of the subject matter disclosed herein. This disclosure is not intended to be limited to the embodiments shown, but is to be accorded the widest scope consistent with the principles and features disclosed or suggested herein.

An embodiment provides an efficient and simple way for location to be shared among multiple parties. It allows resolution of temporary ambiguity about location between parties in a real-time, detailed manner, but without forcing a long-term relationship, or having security credentials created or exchanged between the sharing parties, while still limiting the location information to the desired parties. With the described solution, there is no configuration needed; you can send your location to someone without having to create an account or asking the receivers' to authenticate, so the sharing service can validate who they are. So, a new user can send location in seconds to someone else. Such person does not need to be authenticated; the sender already has their existing email or mobile number.

Figure 1:
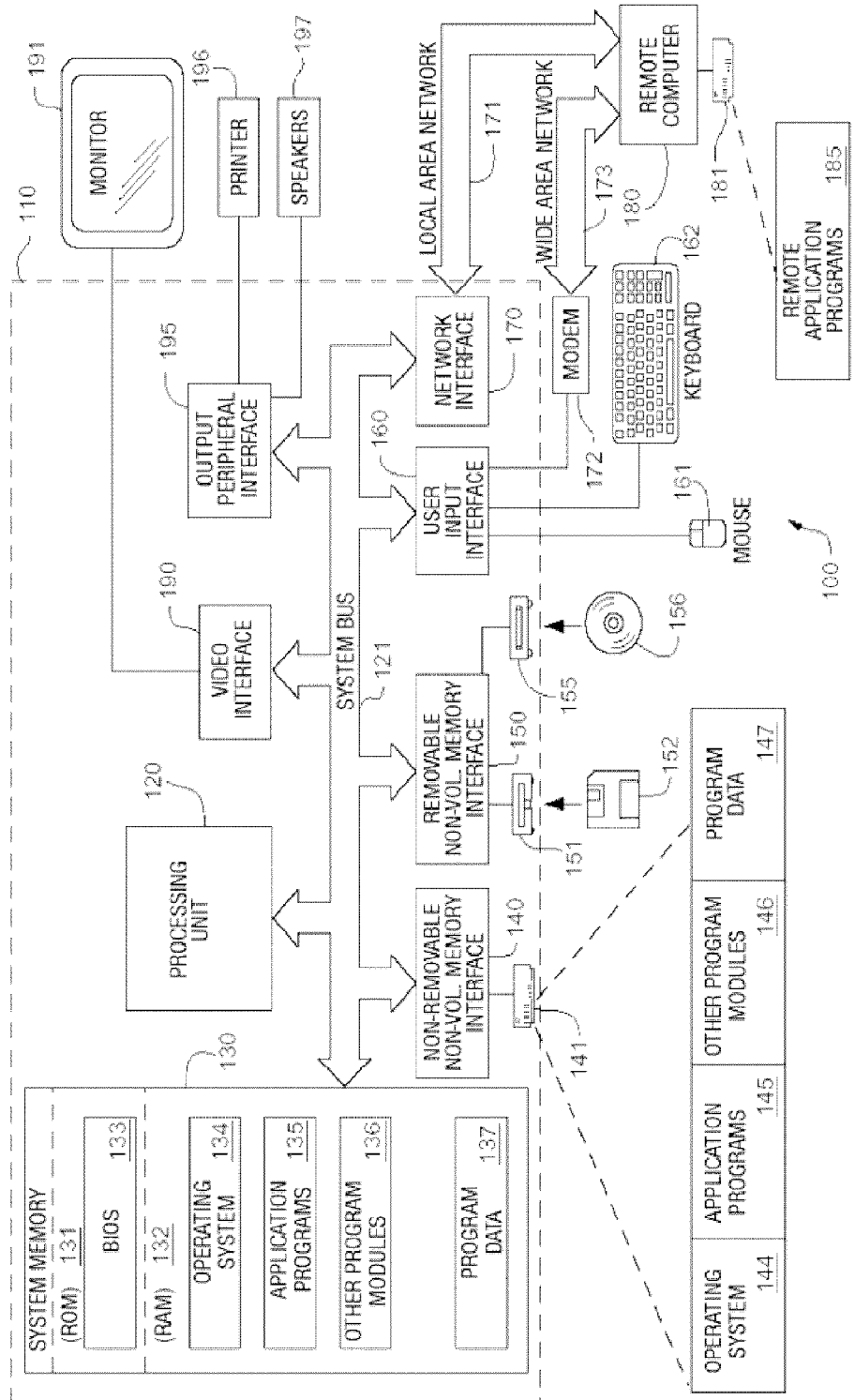
FIG. 1 shows a diagram of a suitable computing environment, such as a personal computer or personal mobile computing device, for practicing the systems and methods of various embodiments of the subject matter disclosed herein.

FIG. 1 and the following discussion are intended to provide a brief, general description of a suitable computing environment in which the subject matter disclosed herein may be implemented. Although not required, aspects of a system and method for sharing location information in a networked computing environment will be described in the general context of computer-executable instructions, such as program modules, being executed by a personal computer and/or computer-readable media on which such instructions are stored. Generally, program modules include routines, programs, objects, components, data structures, etc., that perform particular tasks or implement particular abstract data types. Moreover, those skilled in the art will appreciate that the invention may be practiced with other computer system configurations, including hand-held devices, cellular or mobile telephones, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
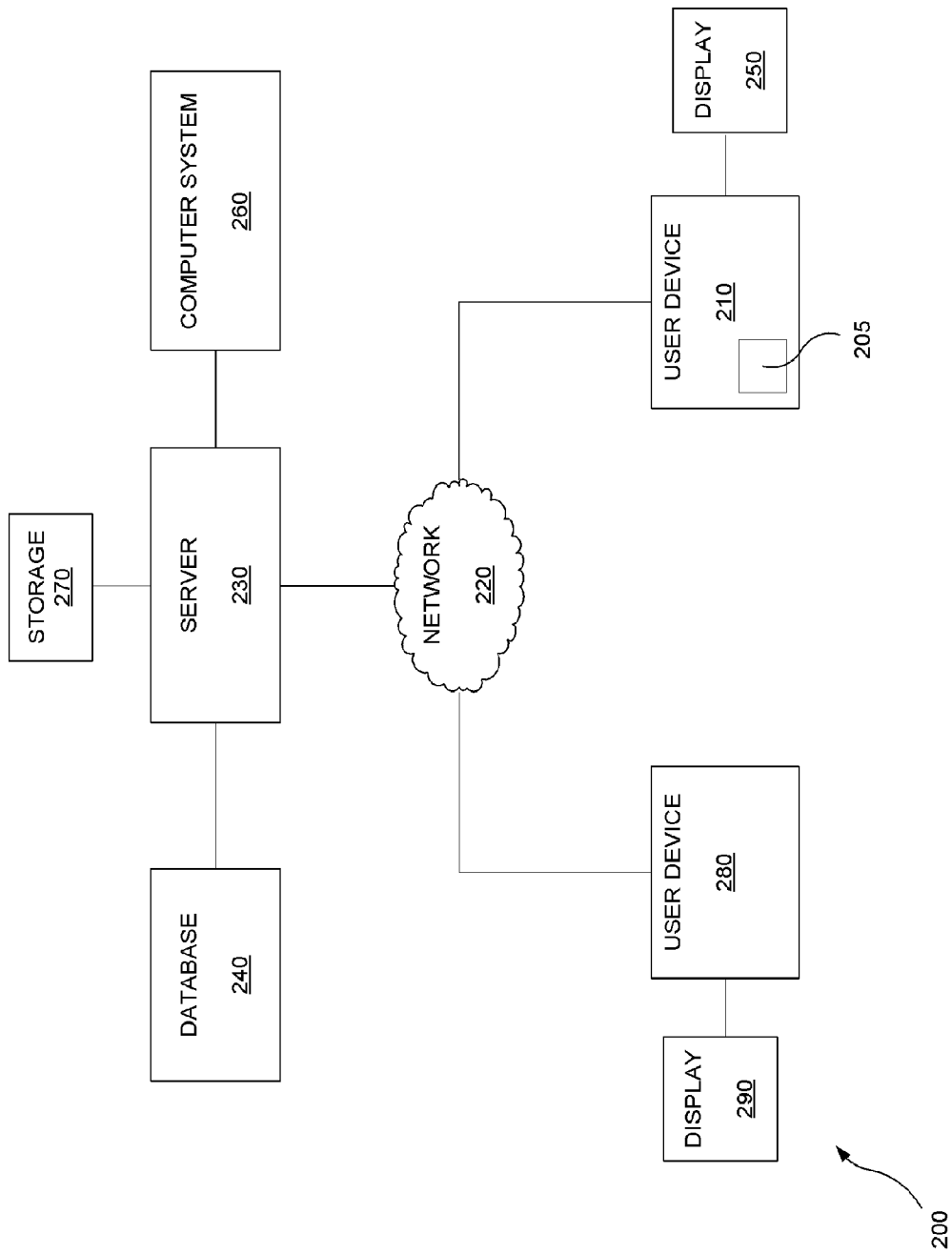
FIG. 2 shows a diagram of a suitable networked computing environment wherein a user may employ the various systems and methods of the subject matter disclosed herein.

Referring now to FIG. 2, an embodiment of the present invention can be described in the context of an exemplary computer network system 200 as illustrated. System 200 includes electronic user devices 210, 280, such as cellular or mobile telephones, personal computers or workstations, that are linked via a communication medium, such as a network 220 (e.g., the Internet), to an electronic device or system, such as a server 230. The server 230 may further be coupled, or otherwise have access, to a database 240, electronic storage 270 and a computer system 260. Although the embodiment illustrated in FIG. 2 includes one server 230 coupled to two user devices 210, 280 via the network 220, it should be recognized that embodiments of the invention may be implemented using two or more such user devices coupled to one or more such servers. Moreover, the network 220 may include or otherwise be coupled to one or more telecommunication towers (not shown) that provide network connectivity to one or more cellular or mobile telephones.

In an embodiment, each of the user devices 210, 280 and server 230 may include all or fewer than all of the features associated with the computer 110 illustrated in and discussed with reference to FIG. 1. User devices 210, 280 include or are otherwise coupled to a computer screen or display 250, 290, respectively. User devices 210, 280 can be used for various purposes including both network- and local-computing processes.

Figure 3:
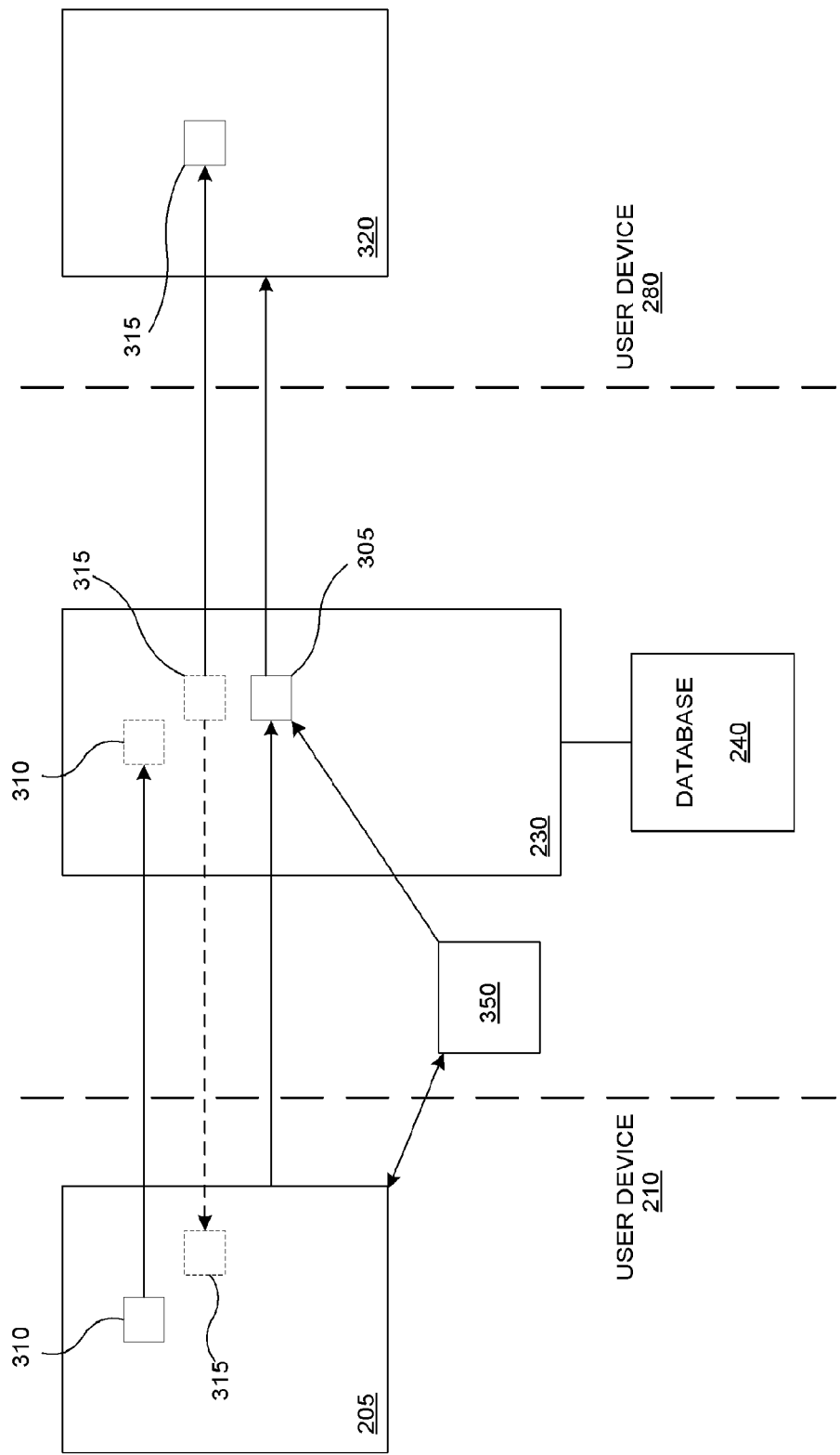
FIG. 3 shows a diagram of a suitable networked computing environment wherein a user may employ the various systems and methods of the subject matter disclosed herein.

The user devices 210, 280 are linked via the network 220 to server 230 so that computer programs, such as, for example, a browser or other applications, running on the user devices 210, 280 can cooperate in two-way communication with server 230. Server 230 may be coupled to database 240 and/or electronic storage 270 to retrieve information therefrom and to store information thereto. Moreover, and as best illustrated in FIG. 3, the server 230 may communicate with the user device 210 (and/or device 280) and/or GPS/triangulation systems 350 known in the art in such manner as to allow the server 230, using map data stored in the database 240, to generate location data 305, such as, for example, HTML data, that may be used by a browser or similar application to display the location of the device 210 (and/or device 280). Additionally, the server 230 may be coupled to the computer system 260 in a manner allowing the server to delegate certain processing functions to the computer system.

Referring to FIGS. 2 and 3, an embodiment includes a client-side application 205 executable on, for example, user device 210. Upon a command of a user of the device 210, the application 205 is operable to send to the server 230 a request 310, including identifying information (e.g., email address, phone number, a service subscriber's user name, etc.) of a user of the user device 280 (or other similar user device), to create authorization data (i.e., a "ticket") that will allow the user of the user device 280 (or the user of the other similar user device) to track the location of the user device 210 and, consequently, the user of the device 210. The application 205 is configured to provide a user interface (not shown) displayable on the display 250. The user interface functions to enable the user of the device 210 to select or otherwise input one or more values defining the start time and/or length of a time interval during which the user of the user device 280 may track the location of the device 210. These values are included in the request 310.

In response to the request 310, the server 230 is configured to generate the ticket 315 and forward the ticket to the user device 280. Alternatively, as indicated in dashed lines in FIG. 3, the server may provide the ticket 315 to the user device 210, whereupon the device 210 may then be used to forward the ticket to the user device 280. The ticket 315, which may be sent via SMS, email, or other suitable messaging format, includes pointing data, such as a selectable link to a URL, that, when selected by the user of the device 280, is configured to provide access to a tracking interface provided by the server 230. The ticket 315 may further include a default message or a customized message input by the user of the device 210.

Specifically, if the user of the device 280 selects a link to the pointing data, the server 230 is configured to provide location data 305 to the device 280 enabling a client application 320, a browser, or other interface resident on the device 280 to generate a display of the geographical location of the device 210. Advantageously, an embodiment merely requires a conventional browser be resident on the device 280 to display the location of the device 210, and does not otherwise require a specific application be installed on the device 280 to do so. The location data 305 may be provided to the device 280 in a recurring manner, such that the user of the device 280 may view the real-time movement of the device 210, or may be provided singly so as to merely provide a "snapshot" of the location of the device 210.

In an embodiment, the server 230 provides the location data 305 to the device 280 only during the time interval designated by the user of the device 210 in generating the request 310. In various embodiments, the user of the device 210 may set the time interval to commence upon the user device 280 first accessing the location data, set the time interval to occur during a specifically designated window of time (e.g., 2-3 PM of a particular day or set of days), or to occur at any other user-specified start and stop time. In an embodiment, the ticket 315 received by the user of device 280 may indicate the nature (e.g., time of commencement, duration, etc.) of the time interval. Additionally, in an alternative embodiment, the user of the device 210, rather than provide the time interval in the request 310 prior to the location data 305 being provided to the device 280, may provide and effectuate the time interval in a request after the device 280 has received the location data and begun tracking the device 210. Similarly, after the device 280 has received the location data and begun tracking the device 210, the user of the device 210 may revoke, or otherwise modify, the effective time interval originally included in the request 310 provided before generation of the ticket 315. Additionally, a particular ticket 315 may be extended to a user other than and additional to the user of device 280. In such case, the ticket may track absolute time remaining. As such, if the ticket 315 is a 30 minute ticket sent 20 minutes ago, it will expire in 10 minutes for both the old and new recipient. Additionally, a predefined, external event may function to modify the sharing-permission time interval. For example, the user of the device 210 may specify that the ticket 315 is valid only until the user has arrived at a user-specified destination. Alternatively, for example, the user of the device 210 may specify that the ticket 315 is valid only upon the user being a predetermined distance (e.g., one mile) from the user's departure location.

Figure 4:
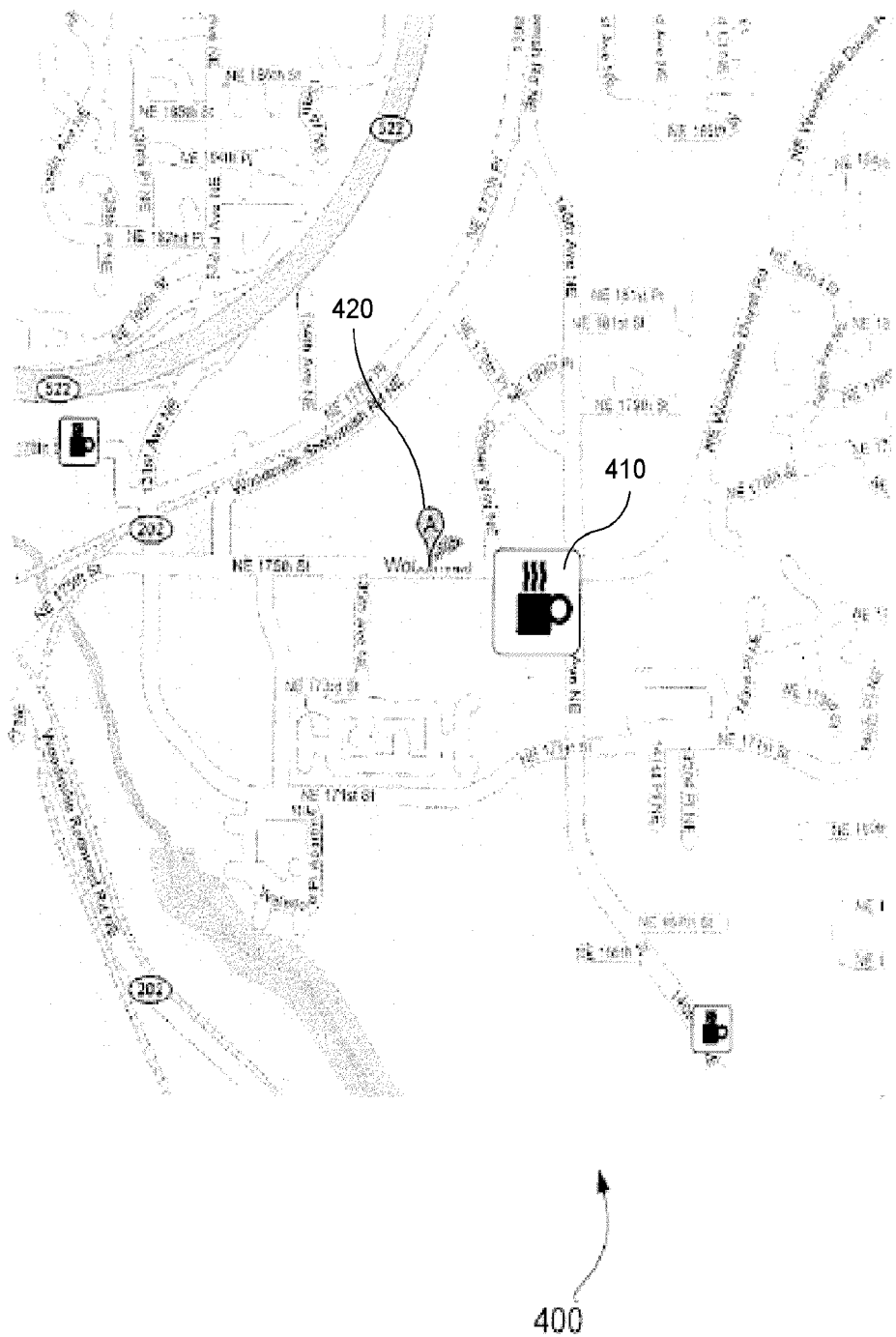
FIG. 4 shows a map that may be displayed on a display according to an embodiment of the subject matter disclosed herein.

In an embodiment, the request 310 may further include an indication of a landmark to which the user and the user device 210 are travelling. Consequently, the server 230, by employing the map data associated with the database 240, may include the geographical location of the landmark with the location data 305. As such, and as illustrated in FIG. 4, the location data 305 can enable the user interface 400 associated with the device 280 to display the geographical location 410 of the landmark in conjunction with the geographical location 420 of the user device 210.

It should be noted that, in an embodiment, all of the functionality discussed above as attributable to the server 230 may instead be performed solely by the application 205 executing on the user device 210 communicating directly with the user device 280 over the network 220. In such an embodiment, the request 310 need not be generated, and the ticket 315 is generated by the user device 210 and issued directly to the user device 280. In such an embodiment, the user device 210 may constantly, or otherwise periodically, send updates to the user device 280 until a time interval associated with a ticket 315 expires. Alternatively, the user device 280 may include an application configured to constantly, or otherwise periodically, poll the user device 210 for location data. As such, in varying embodiments, the server 230 is not necessary for implementation of the functionality described herein.

The following examples serve to illustrate the utility of various embodiments:

Example 1

Bob is running late for a meeting. Bob sends a ticket 315 to Tom via email. Tom receives Bob's email on a browser-enabled mobile telephone, selects a link included in the email, and invokes a browser showing Bob's current position on a map, with real-time updates. Tom can now see when Bob will actually arrive.

Example 2

Latifa and Vanessa are meeting for lunch at a restaurant. Latifa sends Vanessa a ticket 315 via SMS. Vanessa receives Latifa's SMS on a browser-enabled mobile telephone, selects a hyperlink included in the SMS, and invokes a browser showing a map with Latifa's location, as well as the destination where they are to meet. Vanessa can select 'refresh' on her browser to get an updated location of Latifa.

Example 3

Helen is picking up her kids from school. She sends them a ticket 315 via the client 205. The kids can see their mom's location in real time on a map provided by the client 320. The kids are then able to come outside just as Helen pulls up.

Further, the rendered map may also include additional rendered information, such as:

User Tile, Name, on map
Destination Label
Estimated Time of Arrival

If a ticket has expired, the user may be able to render the map with the last location of the user before the ticket expired, and a slightly bolder message about how old the data is.

Embodiments also include:

A "Virtual ComPort" for 1st person view of 3rd person via any app—Make a remote user 'seem' like they the user. So, one may channel their input to another's remote device. (For example, one could see where the user was on a GPS by having it feed on the user's data directly. Existing applications, unchanged, could act as though they were getting data from a separate device/person.

Time delayed data points—user can see where another was, only after that person has left.—"Where was Paris Hilton 5 minutes, 1 day, 1 year ago."

Phone regions—what number to call me on based on my position—When user is home, call user's home phone. When user is at work, work phone. When user is in Russia, user's international phone, etc.

Halo—Visual radar of where user's friends are. For example, an embodiment may provide on a display a view of the location of the user's friends in a manner similar to a conventional sonar/radar display, which may include a sweeping hand or bar.

Have auto-scale with closest friend, friend diameter hints at scale. (Close big, far, small). Outer friends hover around the outer circle.—Adjust image size or screen zoom level to communicate how far away a friend is.

Starbucks® cup around the perimeter moves, showing nearest Starbucks. Steams (hot) as user get closer, slows as you get smaller—User may have a 5 mile scale map, with a Starbucks that is 10 miles to the north which shows up on the border of the map at the top. A Starbucks that is 20 miles to the south would show up on the bottom at ½ the size, for example.

When user is watched, user's update rate is higher. (overridable by user)—Dynamically detect when you are being watched and change your upload frequency based on that, may also be adjusted dynamically by battery life/power.

Clocks (pies) for stopped location. Size could be larger if more recent or size could be larger if spent longer there.

Where's your BellyButton?—Show where the center of gravity is for the physical location of your friends. (Lots of friends in Seattle, bellybutton might be Space needle. Lots of friends in New York, bellybutton might be Kansas. Do the same thing for user's personal travels. "Where is the center of user's daily, monthly, lifetime position."

Icon (glasses) showing when users are being watched.

Caller Location IDShowing Caller Location when a phone call is received. (sending it when a phone call is made).

History of past crossed-paths—Show where users have crossed paths with other people in the past.

Future Calendaring integration into location—Be able to map calendared events to future location crossing, and allow location sharing to be integrated into a calendaring program. (before meetings, allow user to send dynamic location to meeting attendees).

Auto-creating a blog from history of location:

An example may read, as follows: "I left home 20 minutes late today, dropped the kids off at 15 school, was stuck in traffic on 520, stopped off to get a latte at ABC, got gas at Chevron on 123rd ($4.22 a gallon), went to work, had lunch at 12:30 at Joe's bar, carpooled with Joe and went to a Mariners game where they lost 7-3." All of such content may be generated from a list of locations and merged with external information, and may be generated automatically simply from the system logging the movements of the user, without actual entry by the user of the activity descriptions. This blogging functionality, in various embodiments, can be created in a list view, or in prose, with automatic hotlink integration into external information, for example weather, sports scores. Such embodiments may also have hotlink or actual integration with personal information like photos, other blog entries, or other digitally available information and accompanying timeline.

Integration into existing internet applications. For example, an eVite-like invite could use this technology to have attendees all share where their location is right before and during the event. Such could be displayed in the aggregate (e.g., 25 of 50 at party, 20 more arriving in the next 15 minutes, 5 haven't left yet, etc.) or with individual positions.

Sharing location during (and/or at ringtime of) a phone call. (picture location being updated as part of the phone call experience).

Using as a golf game assistant. Marking the ball location as users takes strokes. This data is aggregated for playback, shot analysis, shot prediction, and assisted shot selection. Can also be played back and shared with others for critique, enjoyment, or game integration.

Displaying logistics information about a person via the 'tail' on a map; information such as their speed, time at a location, and staleness of the data may be displayed in an area near a person's icon. For example, the color and/or width and/or length of this 'trailing tail' could represent the speed they were traveling, or how long ago they were at that location.

Another feature includes displaying information that informs a user at any given time that the user's location is 'being viewed', and optionally by whom.

While a preferred embodiment of the invention has been illustrated and described, as noted above, many changes can be made without departing from the spirit and scope of the invention. Instead, the invention should be determined entirely by reference to the claims that follow.

The embodiments of the invention in which an exclusive property or privilege is claimed are defined as follows:

1. A system, comprising:
 a server;
 a source client executable on a first electronic device in communication with the server, the source client configured to permit a user of the first electronic device to send a location sharing request to the server for generating a ticket; and a second electronic device in communication with the server, the second electronic device configured to permit a recipient to receive the ticket from the source client or from the server, wherein the ticket is configured as a customized, URL link generated by the server based on the location sharing request, wherein the server is configured to provide server access to location data viewable on the second electronic device, the location data providing a real time, dynamically updated geographic location of the first electronic device, wherein permission to access the location data viewable on the second electronic device is commanded and controlled by the user of the first electronic device through the request when the user: (a) chooses one or more recipients to share the location data with, (b) selects a time interval that defines how long the location data is viewable on the second electronic device, and (c) intentionally transmits the location sharing request from the source client, and wherein the customized URL link provided to the recipient is transmitted without requiring any security credentials or account creation, without requiring authentication of the recipient and without requiring authentication by the server, and wherein validation of the recipient is accomplished when the user selects the recipient's existing email or phone number using the first electronic device.

2. The system of claim 1, wherein the time interval includes a time value input into first electronic device by the user.

3. The system of claim 1 wherein the location data includes geographical location data for a landmark.

4. The system of claim 1, wherein the time interval commences upon the second electronic device accessing the location data.

5. A computer-readable, non-transitory medium including instructions that, when executed by a source device in cooperation with a server, enables tracking of the source device when performing the steps comprising:

generating a location sharing request, by a sender, using the source device, for a recipient of a recipient device to track a geographic location of the source device, wherein the geographic location is viewable on the recipient device;

receiving the location sharing request at a server, wherein the server transforms the location sharing request into at ticket configured as an encoded, customized URL link;

transmitting the link to the recipient device;

transmitting location data from the server to the recipient device upon selection of the link on the recipient device, the location data comprising real-time, dynamically updated geographic location of the source device; and permitting access to the location data of the source device, without requiring any additional information from or about the recipient and without requiring the recipient to authenticate, login, subscribe, or otherwise identify themselves in order to view the geographic location of the source device, wherein the sender commands and controls access for tracking the geographic location of the source device when the sender selectively chooses the recipient with whom to share the geographic location and selects a time interval that defines how long the geographic location is viewable on the recipient device.

\* \* \* \* \*